Dec. 31, 1968   L. F. KARDOS   3,419,775
ON-OFF AND PROPORTIONAL POSITION SERVO MOTOR CONTROL SYSTEM
Filed May 12, 1965

WITNESSES:
Bernard R. Giegun
James F. Young

INVENTOR
Louis F. Kardos
BY
Clement J. Reynolds
ATTORNEY

United States Patent Office 3,419,775
Patented Dec. 31, 1968

3,419,775
ON-OFF AND PROPORTIONAL POSITION SERVO
MOTOR CONTROL SYSTEM
Louis F. Kardos, Monroeville, Pa., assignor to Westinghouse Electric Corporation, Pittsburgh, Pa., a corporation of Pennsylvania
Filed May 12, 1965, Ser. No. 455,283
4 Claims. (Cl. 318—18)

ABSTRACT OF THE DISCLOSURE

A closed loop position servomechanism including a linear channel and a switching channel is disclosed operative in a linear mode between adjustable positive and negative limits and in a switching mode in excess of these limits. The switching channel consists of an amplifier across one diagonal of a full wave diode bridge with variable positive and negative reference sources across the opposite bridge diagonal. The variable reference sources are provided so that the positive and negative limits of the switching channel may be independently adjusted.

Figure 1:
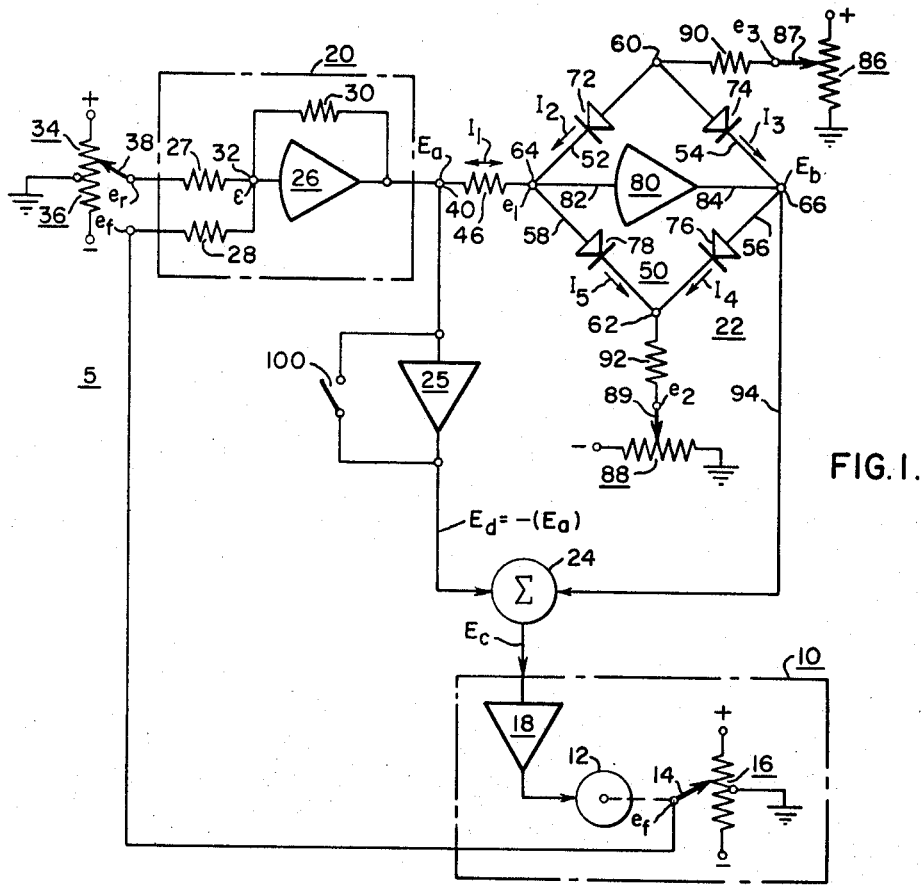

This invention relates to a controller having a transfer characteristic with a linear region followed by an abrupt step region. The invention is especially suitable in a servo system where it is desired to provide a linear response for small errors and a non-linear ON-OFF response for large errors.

It is therefore an object of the present invention to provide a novel controller which has a linear response for small input signals and a non-linear ON-OFF response for large signals.

Another object is to provide a novel controller having a transfer characteristic with a linear region followed by an abrupt step region.

A further object is to provide a novel controller having for small signals a linear response region defined by presettable desired limits, and outside these limits a non-linear response region for larger signals.

A further object of the invention is a novel servo system having a linear response for small errors and a non-linear abrupt step response for greater errors.

The above objects may be attained in accordance with one embodiment of the invention wherein a servo system is provided with a dual mode controller having two parallel systems and modes of operation: (a) a linear or proportional path employing a linear first amplifier which path is active for small signals; and (b) a non-linear system including a second amplifier operated in a switching or saturation mode in response to the output of the first amplifier exceeding predetermined bipolar limits in its linear output.

Other and further objects and advantages of the invention will be apparent from the following detailed description taken in connection with the drawings, wherein a preferred embodiment of the invention is illustrated.

Figure 2:
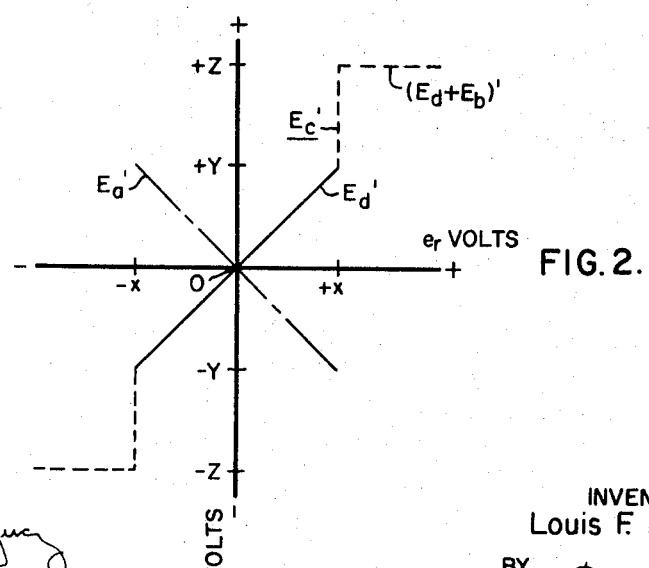

In the drawings:

FIGURE 1 is a schematic diagram of a servo system embodying features of the invention; and FIG. 2 is a curve illustrating the transfer characteristic of the composite controller of FIG. 1.

FIG. 1 illustrates a feedback control system 5 wherein deviation of an output condition of a controlled element from a desired norm is corrected in response to an error signal $\epsilon$ produced by comparing a reference signal $e_r$ representing desired posture of the output condition with a negative feedback signal $e_f$ representing the actual posture of the output condition. The controlled element may be any device or system having an output condition which is to be controlled. By way of example, the controlled element 10 is shown as including a servo motor 12 driving the output arm 14 of a potentiometer 16 connected across a D.C. source. A servo amplifier 18 may or may not be included depending on the power requirement of the servo motor 12. The output condition to be controlled may, for example, be the shaft position of the motor 12 as evidenced by the output voltage $e_f$ of the potentiometer 16. As a corollary the potentiometer output voltage $e_f$ is also a controlled output condition of the controlled element 10.

The feedback controlled system 5 further includes a linear controller 20 which produces an output voltage $E_a$ linearly proportional to the error in the system, and a second controller 22 operated in a switching mode in response to the controller 20 output voltage $E_a$ exceeding predetermined positive and negative values within its linear output range. The controller 20 output $E_a$ and the controller 22 output $E_b$ are algebraically summed in aiding relation to each other in a summing device 24 to produce a composite output voltage $E_C$ which is applied to the input circuit of the controlled element 10. Since in the example shown, controllers 20 and 22 are also signal inverters, the output of one or the other must be inverted in order to combine their outputs in aiding relation. In the present example, this is effected by inserting an inverter 25 such as a —1 gain amplifier between the controller 20 and the summing circuit 24. The output voltage of inverter 25 is $E_D = -(E_A)$. Thus the composite voltage $E_C = E_D + E_B$.

More specifically, controller 20 may, for example, include a direct current amplifier 26 with a network of input impedances 27 and 28 and a feedback impedance 30 arranged to form a proportional operational amplifier having a linear output characteristic. The input circuit to controller 20 includes a summing junction 32 to which the various impedances and the amplifier input are connected. Amplifier 26 is shown by way of example as a bi-directional, direct current amplifier.

A bi-directional amplifier is one which for positive polarity input signals produces an output of particular polarity, and for negative polarity input signals produces an output of polarity opposite to said particular polarity. Bi-directional amplifiers may be of the inverting type or of the non-inverting type. An inverting bi-directional amplifier provides a positive output in response to negative input, and vice versa. The example shown at 26 is an inverting bi-directional amplifier.

An adjustable reference voltage representing the desired position of servomotor 12 is provided by a reference voltage source 34 including a potentiometer 36 connected to a suitable D.C. source in the polarity shown. The potentiometer has a variable arm 38 that is connected through the impedance 27 to the summing junction 32. Potentiometer 16 is also connected across a suitable D.C. power supply and its arm 14 is connected through impedance 28 to the summing junction 32.

The output of controller 20 is on a line 40 which is connected through the inverting amplifier 25 to the summing circuit 24. Additionally, line 40 is connected to one end of an impedance 46 in the input circuit of controller 22.

By way of example, controller 22 includes a bridge 50 having four legs 52, 54, 56 and 58 connected in Wheatstone configuration having two opposite terminals 60 and 62 across one diagonal thereof, and two opposite terminals 64 and 66 across the other diagonal. Each bridge leg includes in series an asymmetric current conducting device, for example, a half wave rectifier or diode as shown. The diodes in legs 52, 54, 56 and 58 are referenced 72, 74, 76 and 78 respectively.

A switching amplifier 80 is connected across the output diagonal of the bridge, the input line 82 of the amplifier being connected to bridge terminal 64, while the output line 84 of the amplifier is connected to bridge terminal 66. Bridge terminal 64 is also connected to the output line 40 of controller 20 through resistor 46. Thus, terminal 64 is the signal input line to controller 22. Amplifier 80 which is operated in the ON-OFF switching mode, may for example be a direct current amplifier having a high gain for instance one million, such that for very small input values applied to the amplifier it will saturate and operate in the switching mode. In the example shown, this amplifier is an inverting bi-directional amplifier.

The opposite terminals 60 and 62 across the input diagonal of bridge 50 are connected to adjustable reference voltage sources 86 and 88 of opposite polarity through impedances 90 and 92 respectively. Source 86, which supplies a positive reference voltage to terminal 60, includes a potentiometer connected across a D.C. supply and provided with an adjustable tap 87. Likewise, source 88 which supplies a negative reference voltage to terminal 62, includes a potentiometer connected across a D.C. supply and provided with a movable contact 89. These reference voltages apply a forward bias to the diodes of the bridge. It should be noted that all the diodes of the bridge are oriented in the same direction (poled alike) with respect to the reference input diagonal of the bridge to which the bias sources 86 and 88 are connected.

Bridge terminal 66 is the output line of controller 22 and is connected to the summing circuit 24 in additive (aiding) relation to the output of controller 20 to produce the composite output voltage $E_c$ which is applied to the controlled element 10.

The bridge 50 whose output diagonal is connected across amplifier 80 from its input to its output, is biased by the reference sources 86 and 88 to operate as a unity negative feedback clamp on amplifier 80 whereby no output is produced on line 66 for transmission to the summing circuit 24 as long as the diodes 72 and 78 remain forward biased. However, opening of the bridge clamp is initiated when the forward bias of diode 72 is overcome by sufficiently high positive values of signal derived from the output line 40, or when the forward bias of diode 78 is overcome in response to sufficiently high negative values of signal derived from the output line 40. The amplifier 80 is turned ON whenever the bridge clamp is opened in response to input signals of sufficient value supplied by the controller 20.

Bias source 86 applies a bias in the forward direction to diodes 72 and 74, and bias source 88 applies a forward bias to diodes 76 and 78. The parameters of the circuit are arranged so that the forward bias of diode 72 is overcome when the output voltage $E_a$ of controller 20 reaches a value (arbitrarily designated $+Y$) on the positive side of its linear output range that will cause positive voltage applied to the terminal 64 to equal the forward voltage applied to diode 72 by the reference source 86. In like manner, the forward bias applied to diode 78 by reference source 88 is overcome when the output voltage $E_a$ of controller 20 reaches a value (arbitrarily designated $-Y$) on the negative side of its linear output range that will cause negative voltage applied to terminal 64 to equal the forward voltage applied to the anode of diode 78 by the reference source 88. When the forward bias on a diode is overcome, the diode is effectively open-circuited.

Until the voltage applied by controller 20 to terminal 64 exceeds the forward voltage applied to diode 72 by the reference source 86, there will be no input to amplifier 80, and consequently no output on its output line 84. It should be noted that the diodes 74 and 76, when forward biased, apply a clamp to the output of amplifier 80, and will not allow the amplifier to saturate and provide an output on the output line 66 of controller 22 until either one or the other diode is opened by nullifying its forward bias. The forward bias of either of diodes 74 and 76 is overcome by a proper polarity output on line 84.

When the controller 20 output voltage $E_a$ reaches and exceeds $+Y$, the forward bias of diode 72 is overcome and the diode is effectively open-circuited, thus opening the left side of the bridge and applying an input voltage to the amplifier 80. As a result, the amplifier is driven to produce a negative voltage due to inversion) on the output line 84. This overcomes the forward bias of diode 76 and opens the right half of the bridge thereby allowing the amplifier 80 to saturate and transmit its high gain output along line 94 to the summing circuit 24.

In like manner, when the controller 20 output signal $E_a$ is negative and exceeds that value in its linear output range which produces sufficient negative voltage at terminal 64 to nullify the forward voltage applied to diode 78 by reference source 88, amplifier 80 will produce a positive signal on line 84 which will overcome the forward bias on diode 74 and thereby unclamp the bridge. This allows the amplifier to saturate, thus to transmit a positive signal along line 94 to the summing circuit 24.

The composite transfer characteristic of controllers 20 and 22 is illustrated by the curve $E_c'$ in FIG. 2 wherein output voltage is plotted along the vertical axis and the reference voltage $e_r$ is measured along the horizontal axis. This the curve $E_c'$ represents the output voltage $E_c$ of the summing circuit 24 for various of $e_r$. Curve $E_a'$ depicts the output voltage $E_a$ of controller before inversion. For this curve, the output voltage $E_a$ on line 40 is measured along the vertical axis, and is plotted with respect to reference voltage $e_r$. The scales are the same for curves $E_c'$ and $E_a'$. The linear portion $E_d'$ (solid line) of curve $E_c'$ is due to output voltage $E_d$ and is the mirror image of curve $E_a'$ due to inversion of amplifier 25 (for convenience shown as 1 to 1). The non-linear region $(E_d+E_b)'$ of curve $E_c'$ is an abrupt step shown in dashed lines at opposite ends of the linear portion $E_d'$, and is due to outputs $E_d+E_b$. $+Y$ and $-Y$ are values of output voltage equally applicable to all the curves. $+X$ and $-X$ are values of the reference voltage $e_r$.

The voltage changes at terminal 64 in response to changes in the output of controller 20 may be explained as follows. For positive output signals $E_a$, resistors 46 and 92 operate as portions of a voltage divider. For negative output signals $E_a$, resistors 46 and 90 operate as portions of a voltage divider. The following conventions are adopted. The current through resistor 46 is $I_1$, the currents through bridge legs 52, 54, 56 and 58 are $I_2$, $I_3$, $I_4$ and $I_5$. The voltage at terminal 64 is $e_1$; the reference voltage at tap 87 is $e_3$ and the voltage at tap 89 is $e_2$. When the reference $e_r$ and feedback voltage $e_f$ supplied to the input of controller 20 are equal and of opposite polarity, the system is the equilibrium. In this balanced condition the voltage $E_a$ and the current $I_1$ are both zero, currents $I_2$ and $I_5$ are equal, and currents $I_3$ and $I_4$ are equal. All the diodes of bridge 50 are forward biased making all the legs of the bridge effective closed circuits. Under these circumstances, the birdge 50 has the effect of a unity feedback circuit around amplifier 80 thus clamping the amplifier in its OFF mode. In the balanced condition, the composite output voltage $E_c$ of controllers 20 and 22 is zero.

Now suppose that the reference potentiometer ram 38 moved in the direction to increase the reference voltage $e_r$ in the negative direction. As the reference voltage $e_r$ is increased negatively, controller 20 output voltage $E_a$ moves positively (because of inversion), current $I_1$ increases, current $I_5=I_1+I_2$ increases, and voltage $e_1$ begins to go positive. The cathode of diode 72 beginning to go positive, reduces current $I_2$. However, the feedback bridge 50 is still closed and the output voltage $E_b$ remains at substantially zero volts.

As voltage $e_r$ moves negatively toward the value $-X$ (FIG. 2) the output voltage $E_a$ moves positively toward the value $+Y$ ($Y$ is equal to $e_3$) and $E_d$ (mirror image of $E_a$) moves negatively toward the value $-Y$. Until $E_a$ reaches the value $+Y$, diode 72 remains forward biased and the feedback bridge 50 closed, thus maintaining amplifier 80 in the OFF mode. As seen in FIG. 2, until $E_a$ reaches the value $+Y$, the output $E_c$ relative to input changes of controller 20 consists of $E_d$ only and is linear. However, as soon as the reference voltage $e_r$ exceeds the value $-X$, the voltage $e_1$ on the cathode of diode 72 exceeds the forward voltage applied by the reference 86 to the diode 72 thereby "opening" diode 72 to open half the bridge. The voltage $e_1$ is amplified by amplifier 80 causing output voltage $E_b$ to become negative (by inversion). This negative output voltage opens diode 76 thus to open the feedback bridge across amplifier 80. As an immediate result, the output voltage $E_b$ abruptly attains a maximum negative voltage value due to saturation cousing $E_c$ to jump to a value $-Z$.

If the input reference voltage $e_r$ is moved positive, the system operates in the previously described manner, except that the diodes 74 and 78 are involved, and the output voltage $E_b$ attains a maximum positive voltage value, driving the output $E_c$ to a value $+Z$.

From the description herein and FIG. 2, it is seen that controllers 20 and 22 from a composite main controller whose output is $E_c$ and has a transfer characteristic which is linear between predetermined positive and negative limits ($+Y$ and $-Y$) and which has abrupt positive (at $+Z$) and negative (at $-Z$) steps immediately following the positive and negative limits of the linear region. Thus for small errors the servo system has a linear response. However, for greater errors the response is a non-linear step which applies sudden forcing to the servo system for faster action in correcting a large error.

In the example shown, the controller 22 output $E_b$ will be zero when the controller 20 output $E_a$ is in its linear range between the values $$-R_1 \frac{e_3}{R_3} \text{ and } R_1 \frac{e_2}{R_2}$$

where $R_1$, $R_2$ and $R_3$ are the resistance values of resistors 46, 92 and 90 respectively. Between these positive and negative limits of the linear output of controller 20, the voltage $e_1$ will be insufficient to overcome the forward bias of either of diodes 72 and 78 (depending on the polarity of input signal being considered) and the bridge 50 acts as a unity gain feedback clamp across the amplifier 80 from input to output. However, when the controller 20 output $E_a$ exceeds these positive and negative limiting values, the forward bias on diode 72 or diode 78 (depending on input signal polarity) is overcome, this driving amplifier 80 to overcome the bias on diode 74 or diode 76 as the case may be, and the bridge feedback is opened up, thereby abruptly driving amplifier 80 into saturation and the controller 22 into the ON mode. The positive and negative limits of the linear range of the controller 20 output $E_a$, beyond which the controller 22 is driven to its ON mode, may be changed by changing the forward voltage applied to the bridge diodes. In the example shown, this may be done by adjusting the taps 87 and 89 as desired. Thus, the invention provides a composite controller having a characteristics with an adjustable linear region for small input signals, immediately followed by an abrupt (substantially vertical) step reigon for larger input signals.

In some servo work, it is desirable to abruptly limit the drive applied to the servo motor to a particular value below a predetermined limit on the linear portion of the response characteristic. This is accomplished with the invention by algebraically combining the outputs $E_a$ and $E_b$ in opposing relation to produce the composite output $E_c$. This may be effected with the circuit of FIG. 1, by closing a switch 100 to bypass the inverter 25, whereby outputs $E_a$ and $E_b$ are algebraically added in the summing junction 24 in opposing relation instead of the previously described aiding relation occurring when switch 100 is open. The value of the abrupt downward limiting step is determined by the output of amplifier 80 which may be designed for the desired output, or whose output may be attenuated to a desired value by a suitable potentiometer in the amplifier output circuit.

It is to be understood that the herein described arrangements are simply illustrative of the principles of the invention, and that other embodiments and applications are within the spirit and scope of the invention.

I claim as my invention:

1. Control apparatus comprising a first bi-directional amplifier having a bi-directional linear output range, said first amplifier having a first input circuit and a first output circuit, a controller having respective ON and OFF modes of operation, said controller having a second input circuit and a second output circuit, said controller including a second bi-directional amplifier connected between said second input and output circuits, said first output circuit being coupled to said second input circuit, summing means, and means coupling the first and second output circuits to said summing means, whereby signals derived from the first and second output circuits are algebraically added by said summing means, said controller including a clamping circuit coupled across said second amplifier from input to output for clamping the second amplifier so that the controller operates in the ON mode when the output of the first amplifier exceeds predetermined positive and negative values in its linear range, and in the OFF mode when the output of the first amplifier is between said positive and negative values, said clamping circuit comprising a four-legged Wheatstone configurated bridge having an asymmetric device in each leg, said bridge having two opposite terminals across each diagonal thereof, the respective terminals across one diagonal of the bridge being connected to the input and output respectively of the second amplifier, a first variable reference source of given polarity connected to one terminal of the other diagonal of the bridge for setting said positive predetermined values, and a second variable reference source of opposite polarity connected to the other terminal of said other diagonal of the bridge for setting said negative predetermined values, said asymmetric devices being poled alike relative to said other diagonal of the bridge.

2. The combination as in claim 1 wherein said first and second output circuits are so coupled to said summing means that signals derived from the first and second output circuits are algebraically added in aiding relation by said summing means.

3. The combination as in claim 1 wherein said first and second output circuits are so coupled to said summing means that signals derived from the first and second output circuits are algebraically added in opposing relation by said summing means.

4. Control apparatus comprising a first bi-directional amplifier having a bi-directional linear output range, said first amplifier having a first input circuit and a first output circuit, a controller having respective ON and OFF modes of operation, said controller having a second input circuit and a second output circuit, said controller including a second bi-directional amplifier connected between said second input and output circuits, first resistance means coupling said first output circuit to said second input circuit, summing means, and means coupling the first and second output circuits to said summing means, whereby signals derived from the first and second output circuits are algebraically added by said summing means, said controller including a clamping circuit coupled across the second amplifier from input to output for clamping the second amplifier so that the controller operates in the ON mode when the output of the first amplifier exceeds predetermined positive and negative values in its linear range, and in the OFF mode when the output of the first amplifier is between said positive and negative values, said clamping circuit comprising a four-legged Wheatstone configurated bridge having an asymmetric device in each leg, said bridge having two opposite terminals across each diagonal thereof, the respective terminals across one diagonal of the bridge being connected to the input and output respectively of the second amplifier, second and third resistance means, a reference source of given polarity connected through said second resistance means to one terminal of the other diagonal of the bridge, and a reference source of opposite polarity connected through said third resistance means to the other terminal of said other diagonal of the bridge, said asymmetric devices being poled alike relative to said other diagonal of the bridge.

References Cited

UNITED STATES PATENTS

| | | |
|---|---|---|
| 2,663,832 | 12/1953 | McDonald et al. |
| 2,777,285 | 1/1957 | McDonald. |
| 2,796,569 | 6/1957 | McDonald et al. |
| 2,921,247 | 1/1960 | Morrison. |
| 3,089,988 | 5/1963 | Stillings. |

ORIS L. RADER, *Primary Examiner.*

THOMAS E. LYNCH, *Assistant Examiner.*

U.S. Cl. X.R.

318—28